(12) United States Patent
Le Chevalier et al.

(10) Patent No.: US 9,542,538 B2
(45) Date of Patent: Jan. 10, 2017

(54) ELECTRONIC CONTENT MANAGEMENT AND DELIVERY PLATFORM

(71) Applicants: Vincent Le Chevalier, San Jose, CA (US); Charles F. Geiger, San Jose, CA (US); Brent S. Tworetzky, Palo Alto, CA (US); Ashit Joshi, San Jose, CA (US); Dax Eckenberg, Los Gatos, CA (US); Rahul Ravindra Mutalik Desai, San Jose, CA (US)

(72) Inventors: Vincent Le Chevalier, San Jose, CA (US); Charles F. Geiger, San Jose, CA (US); Brent S. Tworetzky, Palo Alto, CA (US); Ashit Joshi, San Jose, CA (US); Dax Eckenberg, Los Gatos, CA (US); Rahul Ravindra Mutalik Desai, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 99 days.

(21) Appl. No.: 13/644,731

(22) Filed: Oct. 4, 2012

(65) Prior Publication Data
US 2013/0124972 A1    May 16, 2013

Related U.S. Application Data

(60) Provisional application No. 61/741,771, filed on Oct. 4, 2011.

(51) Int. Cl.
*G06F 17/00* (2006.01)
*G06F 21/10* (2013.01)
(Continued)

(52) U.S. Cl.
CPC ........... *G06F 21/10* (2013.01); *G06F 17/2235* (2013.01); *G06F 17/2247* (2013.01);
(Continued)

(58) Field of Classification Search
CPC .... G06F 17/24; G06F 17/211; G06F 17/2235; G06F 17/2247; G06F 17/248; G06F 17/218; G06F 17/30887; G06F 17/30014; G06F 17/30882; G06F 21/10; G06F 21/121; G06F 21/128
(Continued)

(56) References Cited

U.S. PATENT DOCUMENTS 6,618,751 B1 * 9/2003 Challenger et al. .......... 709/213
7,475,335 B2 * 1/2009 Krishna et al. ............... 715/229
(Continued)

FOREIGN PATENT DOCUMENTS

WO    WO 2004/017277 A2    2/2004
WO    WO 2006/014727 A1    2/2006

OTHER PUBLICATIONS

PCT International Search Report and Written Opinion, PCT/US2012/058651, Dec. 10, 2012, 11 Pages.
(Continued)

*Primary Examiner* — Thu Huynh
(74) *Attorney, Agent, or Firm* — Fenwick & West LLP

(57) ABSTRACT

An education digital reading platform provides aggregation, management, and distribution of digital education content and services. The platform ingests content from a variety of content sources, transforms the content for web-based publication, and distributes the content to connected end-user devices via a network. The transformed content preserves the original page structure of the content document regardless of the original format of the content file. As the user experiences the content, the user's web browser regularly communicates with the platform for updating reading content and connected services. User-generated content such as notes are uploaded to the platform so that the user's user-generated content can be accessed from any of the user's
(Continued)

registered devices. Moreover, the platform enables the user-generated content and other user activities to be optionally shared among friends, classmates, campus, or other groups, as part of an education social platform.

17 Claims, 6 Drawing Sheets

(51) Int. Cl.
*G06F 21/12* (2013.01)
*G06F 17/30* (2006.01)
*G06F 17/22* (2006.01)

(52) U.S. Cl.
CPC .. *G06F 17/30014* (2013.01); *G06F 17/30882* (2013.01); *G06F 17/30887* (2013.01); *G06F 21/121* (2013.01); *G06F 21/128* (2013.01)

(58) Field of Classification Search
USPC ......... 715/234–235, 238–239, 243, 255, 273
See application file for complete search history.

(56) References Cited

U.S. PATENT DOCUMENTS

| | | | |
|---|---|---|---|
| 7,543,224 B2 * | 6/2009 | Schwartz | 715/234 |
| 7,627,592 B2 | 12/2009 | Crockett et al. | |
| 7,747,941 B2 * | 6/2010 | Campbell et al. | 715/234 |
| 8,001,487 B2 | 8/2011 | Koppert | |
| 8,296,686 B1 | 10/2012 | Tedesco et al. | |
| 2002/0062384 A1 * | 5/2002 | Tso | H04L 29/06 709/229 |
| 2002/0064767 A1 | 5/2002 | McCormick et al. | |
| 2002/0078105 A1 * | 6/2002 | Hamada et al. | 707/530 |
| 2002/0120757 A1 * | 8/2002 | Sutherland et al. | 709/229 |
| 2002/0157111 A1 * | 10/2002 | Reams | 725/112 |
| 2003/0074559 A1 | 4/2003 | Riggs | |
| 2003/0229900 A1 | 12/2003 | Reisman | |
| 2004/0064351 A1 | 4/2004 | Mikurak | |
| 2004/0093355 A1 * | 5/2004 | Stinger | 707/104.1 |
| 2004/0167987 A1 * | 8/2004 | Reese | G06F 9/465 709/238 |
| 2004/0199876 A1 | 10/2004 | Ethier et al. | |
| 2004/0205559 A1 * | 10/2004 | Sirhall | 715/513 |
| 2004/0205628 A1 * | 10/2004 | Rosenholtz et al. | 715/526 |
| 2005/0289182 A1 | 12/2005 | Dandian et al. | |
| 2006/0153380 A1 | 7/2006 | Gertner | |
| 2006/0265418 A1 * | 11/2006 | Dolezal et al. | 707/102 |
| 2006/0271867 A1 | 11/2006 | Wang et al. | |
| 2006/0287920 A1 * | 12/2006 | Perkins et al. | 705/14 |
| 2007/0089053 A1 | 4/2007 | Uhlig et al. | |
| 2007/0277102 A1 * | 11/2007 | Kanzaki | 715/540 |
| 2008/0070220 A1 | 3/2008 | McAvoy et al. | |
| 2008/0082381 A1 | 4/2008 | Muller et al. | |
| 2008/0148067 A1 | 6/2008 | Sitrick et al. | |
| 2008/0215897 A1 | 9/2008 | Doyle et al. | |
| 2008/0235564 A1 * | 9/2008 | Erol et al. | 715/202 |
| 2009/0030671 A1 * | 1/2009 | Kwon et al. | 704/2 |
| 2009/0125544 A1 | 5/2009 | Brindley | |
| 2009/0144614 A1 | 6/2009 | Dresevic et al. | |
| 2009/0182716 A1 | 7/2009 | Everhart et al. | |
| 2009/0271872 A1 * | 10/2009 | Ishizuka et al. | 726/28 |
| 2009/0327867 A1 * | 12/2009 | Nielsen et al. | 715/239 |
| 2010/0017615 A1 | 1/2010 | Boesgaard | |
| 2010/0077319 A1 | 3/2010 | Xu et al. | |
| 2010/0151431 A1 | 6/2010 | Miller | |
| 2010/0185868 A1 | 7/2010 | Grecia | |
| 2010/0192210 A1 * | 7/2010 | Purdy, Sr. | G06F 21/10 726/7 |
| 2010/0269030 A1 | 10/2010 | Dugonjic et al. | |
| 2010/0313161 A1 | 12/2010 | Le Chevalier et al. | |
| 2011/0066636 A1 | 3/2011 | Guido et al. | |
| 2011/0078041 A1 | 3/2011 | Barker | |
| 2011/0099382 A1 | 4/2011 | Grecia | |
| 2011/0106970 A1 | 5/2011 | Song et al. | |
| 2011/0184811 A1 | 7/2011 | Patwa et al. | |
| 2011/0197121 A1 * | 8/2011 | Kletter | 715/234 |
| 2011/0213655 A1 | 9/2011 | Henkin et al. | |
| 2011/0229035 A1 | 9/2011 | Sohma et al. | |
| 2011/0252315 A1 | 10/2011 | Misawa et al. | |
| 2011/0296291 A1 * | 12/2011 | Melkinov et al. | 715/229 |
| 2012/0016656 A1 * | 1/2012 | Travieso et al. | 704/2 |
| 2012/0042236 A1 * | 2/2012 | Adler et al. | 715/234 |
| 2012/0158737 A1 | 6/2012 | Levy et al. | |
| 2012/0240243 A1 | 9/2012 | Allardyce | |
| 2013/0015946 A1 | 1/2013 | Lau et al. | |
| 2013/0031451 A1 | 1/2013 | Rubinstein et al. | |

OTHER PUBLICATIONS

PCT International Search Report and Written Opinion, PCT/US2012/067127, Feb. 11, 2013, 10 Pages.
PCT International Search Report and Written Opinion for PCT/US2012/065623, Jan. 30, 2013, 6 Pages.

* cited by examiner

ELECTRONIC CONTENT MANAGEMENT AND DELIVERY PLATFORM

This application claims the benefit under 35 U.S.C §119 (e) of Provisional Application No. 61/674,771, filed Oct. 4, 2011, which is incorporated by reference in its entirety.

BACKGROUND

1. Field of the Invention

This invention relates to a publishing platform for aggregating, managing, and delivering electronic content to connected consumer electronic devices.

2. Description of the Related Art

The education publishing industry faces a number of significant challenges to effectively delivering media and services through an on-line delivery network. These challenges center around four discrete phases:

1. Ingestion: A lack of digital textbook standardization, a plethora of incompatible formats, and a lack of integration and interoperability between publishers makes it difficult to ingest and aggregate a large volume of educational content efficiently and reliably.

2. Publishing: Significant transformation of education content needs to be undertaken to ensure that the content is suited to publish across a variety of client devices that users may use to access the content.

3. Distribution: In an electronic distribution environment, particular attention needs to be given to issues of content protection and rights management, as well as service policies and quality of service, so that content providers are fairly compensated and users of the content perceive the value and reliability of the service.

4. Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an on-line delivery network.

SUMMARY

Embodiments of the invention provide an education digital reading platform that provides aggregation, management, and distribution of digital education content and services. An education digital publishing platform ingests content from a variety of content sources, transforms the content for web-based publication, and distributes the content to connected end-user devices.

In one embodiment, the education digital reading platform includes an ingestion system. The ingestion system checks content files from a variety of content sources for conformity to one of a variety of content format standards, assigns a unique identifier to each content file, and stores the content files for access by other systems of the education digital reading platform.

In one embodiment, the education digital reading platform includes a publishing system. The publishing system transforms content, for example from PDF or ePUB format, into a markup language such as HTML5 web format for distribution across a variety of consumer electronic devices connected to the platform via a network. The transformed content preserves the original page structure of the content document regardless of the original format of the content file. In one implementation, a correlation sub-system compares the rendered HTML5 pages to the original source pages, and establishes a correlation factor between the files that is indicative of the page fidelity quality. In one implementation, the publishing system also associates, creates, or extracts metadata for every content file added to the platform. For example, an enhanced metadata process creates an additional layer of metadata based on a combination of semantic analysis and business intelligence. The enhanced metadata can be used to support the delivery of services related to the education digital reading platform.

In one embodiment, the education digital reading platform includes a distribution system. The distribution system packages the content for delivery, uploads the content to content distribution networks, and makes the content available to end-users based on the digital rights management policies that govern access to that content. The users access the content and related services from client devices connected via a network. For example, client software within a HTML5 compatible browser on the user's client device receives HTML5 formatted content along with a host of document specific metadata that enhance the user's reading experience with the document.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Figure 1:
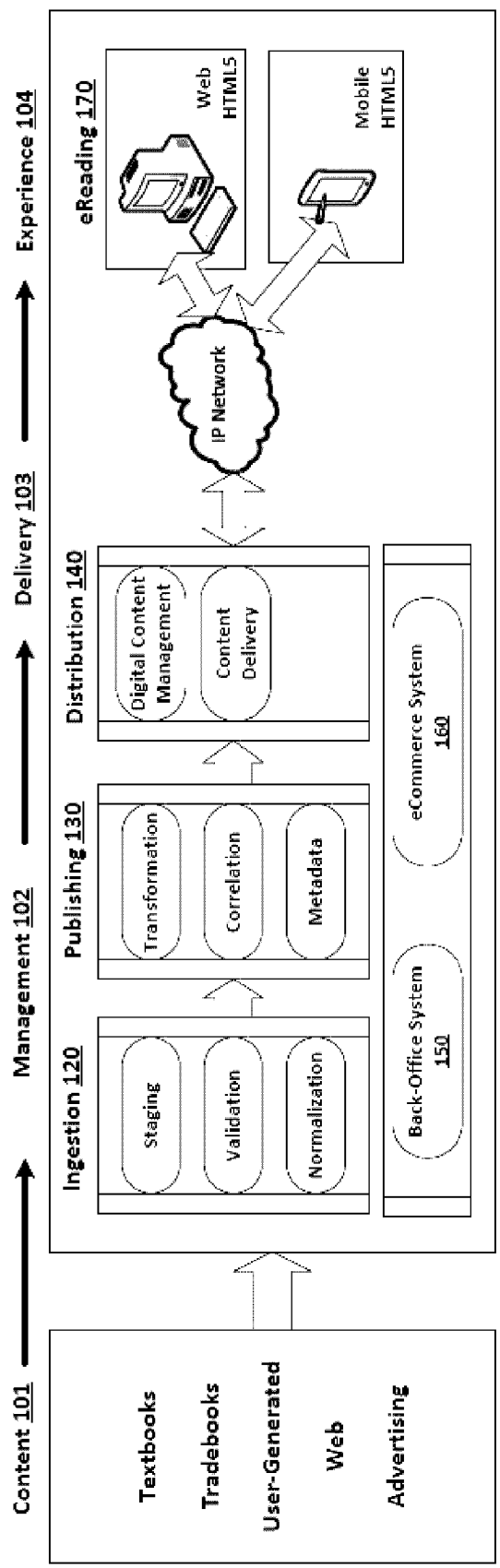
FIG. 1 is a high-level block diagram of a platform environment in accordance with an embodiment of the invention.

Embodiments of the invention provide an education digital reading platform that provides aggregation, management, and distribution of digital education content and services. The platform is an integrated solution for delivering content and education services through an on-line delivery network to connected client devices. FIG. 1 is a high-level block diagram of the platform environment in accordance with an embodiment of the invention. As illustrated in FIG. 1, the platform is organized around four main function blocks: content 101, management 102, delivery 103, and experience 104.

Content 101: The platform is configured to automatically gather and aggregate content from a large number of sources, categories, and partners. Examples of content include textbooks, tradebooks, user-generated content, web content, and advertising content. The content function block 101 of the platform collects the content into a formalized staging environment for further processing by the platform.

Management 102: The management function block 102 represents the core of the platform. The management function block 102 is based on five sub-systems and related processes, including ingestion 120, publishing 130, distribution 140, back-office 150 and eCommerce 160. The management function block 102 aggregates, validates, transforms, packages, and monetizes the content collected by the content function block 101 into a number of business services, prior to distribution by the platform. The ingestion sub-system 120 will be described in detail with reference to FIG. 2, the publishing sub-system 130 with reference to FIG. 3, the distribution sub-system 140 with reference to FIG. 4, the back-office sub-system 150 with reference to FIG. 5, and the eCommerce sub-system 160 with reference to FIG. 6.

Delivery 103: In the delivery function block 103, wired and wireless delivery networks are used to distribute content and services seamlessly across a wide variety of connected consumer devices. The delivery function block 103 packages the content for end-user consumption by distributing it across a hybrid network of traditional Content Delivery Networks (CDN) and other infrastructure. Content is then authorized for on-line delivery based on end-user rights management, content policies and user profiles. The delivery function block 103 also monitors and reports overall quality of service, and network and distribution specific activities, in some embodiments.

Experience 104: In the experience function block 104, users access the content from web browsers on consumer devices connected to a network, such as a personal computer (such as a desktop, laptop, or tablet computer), a personal digital assistant, a mobile or smart phone, or a television "set-top box" using a client web application. As a result of transforming education content and serving it through this platform, users enjoy high-quality and consistent education reading experiences and connected services. As the user experiences the content, the user's web browser regularly communicates with the platform for updating reading content and connected services. This client-server communication system is used to aggregate and upload various end-user data to report the user's reading activities to the platform as well as checking the type and quality of the network to which the user's device is connected.

In one implementation, contrary to other existing digital publishing services such as Amazon Kindle, the user is not required to download a specific reading application from the publisher on to an end-user device in order to access the content. There is no stand-alone application needed to access the education content and services. Rather, client software within a HTML5 compatible browser on the user's computer receives structureless HTML5 page elements to construct pages of a document, along with a host of document specific metadata that enhance the user's reading experience with the document, such as, for example, thumbnail navigation and an interactive table of contents. The client software integrates a number of the user's reading activities, such as, for example, creating highlights, taking notes, and accessing a dictionary. Annotation services enable a reader to create highlights, drawings, notes, comments, and other personalized data that is overlaid within the original content. This type of user-generated content is stored and archived into the on-line end user account so that it can be synchronized across all registered devices for given end-user. Thus, the user's user-generated content can be accessed front any of the user's registered devices. Moreover, the platform enables the user-generated content and other user activities to be optionally shared among friends, classmates, campus, or other groups, as part of an education social platform.

Ingestion System

Figure 2:
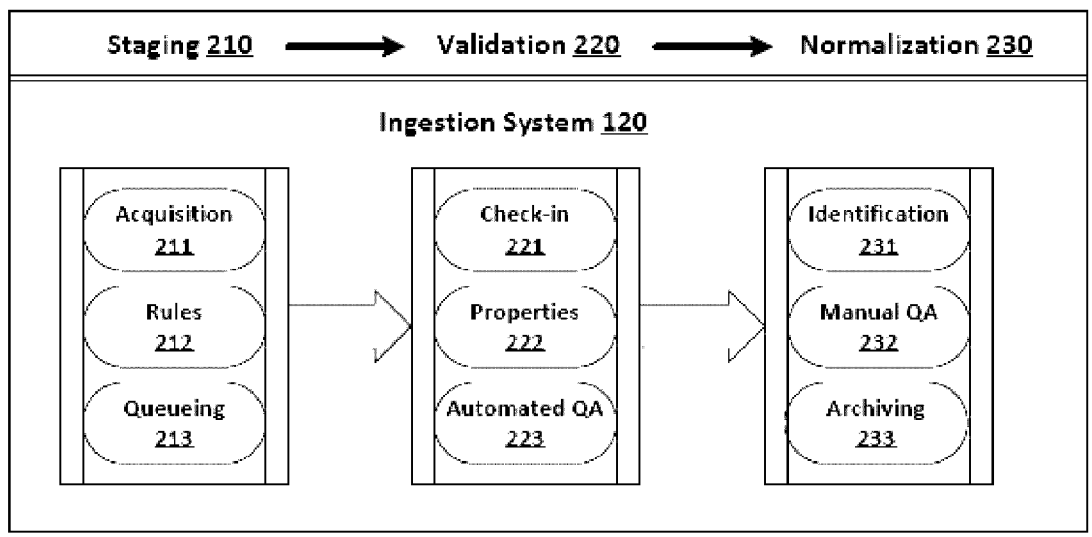
FIG. 2 illustrates a block diagram of an ingestion system, in accordance with an embodiment of the invention.

FIG. 2 illustrates a block diagram of an ingestion system 120, in accordance with an embodiment of the invention. The ingestion system 120 is a sub-system of the management function block 102 of the platform illustrated in FIG. 1. The ingestion system 120 includes three primary sub-systems: staging 210, validation 220, and normalization 230.

Staging 210: The content staging sub-system 210 of the ingestion system 120 includes three processes: acquisition 211, rules creation 221, and queueing 213. The acquisition process 211 includes mapping the source and characteristics of all the content to be ingested. Example characteristics include type of content (such as user-generated content), file formats (such as PDF/A, ePub, etc.), and file manifest (a list of files associated to a specific title). Depending on the type of content, this process includes receiving inputs from various parts of the platform. The rules creation process 212 includes creating individual rules to determine ownership, file location, characteristics, properties, naming conventions, and other operational data that govern content for any given source, based on the acquisition process. Then, based on the rule definition, the content is queued 213 for subsequent processing.

Validation 220: The validation sub-system 220 of the ingestion system 120 includes three processes: check-in 221, properties 222, and automated quality assurance 223. The check-in process 221 checks file integrity and conformity to standards, for example PDF, ePUB2, ePUB3, XML, HTML, and other content formats. The properties process 222 associates content files that pass the check-in process 221 to a manifest that records changes applied to the content in subsequent processing of the content for publication by the platform. Content files that do not pass the check-in process 221 are flagged for further testing and validation. The further testing and validation may be performed, for example, by an automated quality assurance process 223. The automated quality assurance process 223 can support a large amount of content processed within the ingestion system 120.

Normalization 230: The normalization sub-system 230 of the ingestion system 120 includes three processes: identification 231, manual quality assurance 232, and archiving 233. The identification process 231 assigns a unique identifier to each processed content file that identifies the content within the platform. The manifest for each content file is updated to include basic properties such as file name, size, source, type, time, and other ingestion specific processed data. In the manual quality assurance process 232, files that were flagged by the automated quality assurance process 223 of the validation sub-system 220 may be further inspected by a team of quality assurance engineers. Files that cannot be repaired are returned to their owner for correction. In the archiving process 233 of the normalization subsystem 230, files that are successfully processed and identified are stored in a database for access by the publishing system 130.

Publishing System

Figure 3:
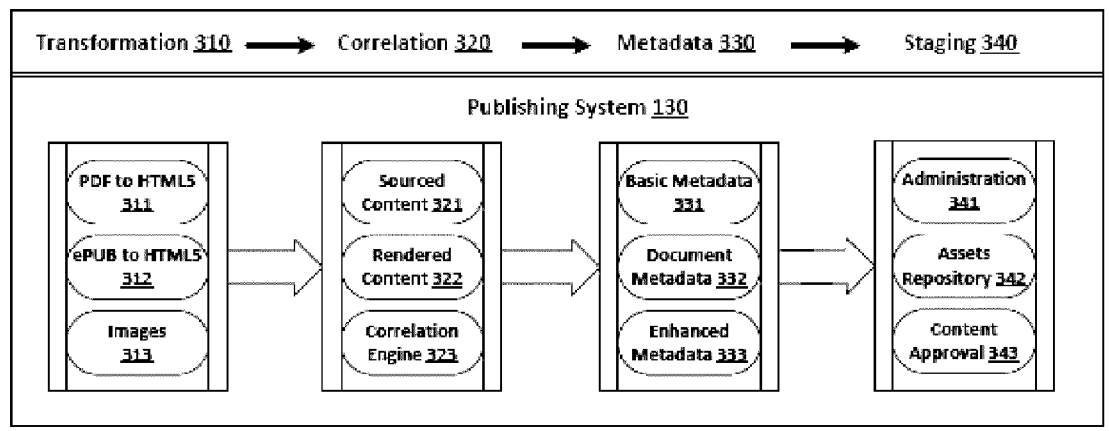
FIG. 3 illustrates a block diagram of a publishing system, in accordance with an embodiment of the invention.

FIG. 3 illustrates a block diagram of a publishing system 130, in accordance with an embodiment of the invention. The publishing system 130 is a sub-system of the management function block 102 of the platform illustrated in FIG. 1. The publishing system 130 transforms ingested printed and other documents into, for example, an HTML5 web format (or other markup language with suitable characteristics) with enhanced metadata, which is well-suited to distribution across a wide variety of consumer electronic devices connected to the platform via a network. It is noted that although embodiments of the invention are described herein with reference to HTML5, other markup languages with suitable characteristics may also be used in place of HTML5. The transformed content preserves the original page structure of the printed document, including the pagination of the original printed document, the number of cots and arrangement of paragraphs, the placement and appearance of graphics, titles and captions, and the fonts used, which are collectively referred to as preserving "page fidelity" of the printed document. Page fidelity is preserved by the publishing system 130, regardless of the original format of the source content provided by the content provider, and regardless of the complexity of the layout of the original document. The publishing system 130 includes four primary sub-systems: transformation 310, correlation 320, metadata 330, and staging 340.

Transformation 310: The transformation sub-system 310 of the publishing system 130 includes three processes: PDF to HTML5 311, ePUB to HTML5 312, and images 313. In the PDF to HTML5 process 311, normalized PDF files are converted into sets of HTML5 web pages. This process keeps the page structure of the original file so that page fidelity is maintained even after the transformation to HTML5 is completed. In the ePUB to HTML5 process 312, similarly to PDF files, normalized ePUB3 files are converted into sets of HTML5 pages. This approach removes the need to download ePLTB files along with a specific ePUB reader application to end-user devices. Thus, all published content is transformed into a set of secured downloadable individual HTML pages regardless of the original source content format. In the images process 313, all image content is transformed into bit maps. These bit maps can be exact copy images of the original source content before the transformation process is applied.

Correlation 320: The correlation sub-system 320 of the publishing system 130 includes three processes: sourced content 321, rendered content 322, and correlation engine 323. During the HTML5 transformation, the page fidelity quality of the original document can be compromised by special characters, unusually complex layout and target Web Browser HTML conformity issues. To identify these potential differences, the correlation sub-system 320 compares the rendered HTML5 pages to the original source pages, and establishes a correlation factor between these files. The sourced content process 321 analyzes the original sourced content. Similarly, the rendered content process 322 analyzes the HTML5 rendered content. The correlation engine process 323 establishes a correlation factor between the sourced content and the rendered content that is indicative of the page fidelity quality. The correlation engine process 323 may use multiple different analysis techniques for comparing the sourced content and the rendered content, and the selection of a particular technique for a page may depend on the complexity of the page. For a simple page of only text, a simple text recognition algorithm may be used. For a complex document including various graphics, a mathematical process of analysis and comparison similar to a video face recognition algorithm that has been applied to complex document layout recognition can be used. In one embodiment, the correlation engine process 323 is configured to automatically analyze and compare large volumes of rendered HTML5 content across a matrix of targeted web browsers, such as Internet Explorer, Safari, Firefox, Opera, and other browser implementations, without manual intervention. For example, a typical book of several hundred pages, once converted into a single set of HTML5 pages, is tested against a matrix of selected web browsers for page fidelity accuracy. This involves potentially thousands of HTML5 pages that an automated system needs to analyze and flag for potential page fidelity problems. If the correlation factor does not at least meet a minimum threshold established for page fidelity quality, the page is flagged.

Metadata 330: The metadata sub-system 330 of the publishing system 130 includes three processes: basic metadata 331, document metadata 332, and enhanced metadata 333. These metadata processes together form the basis for services that augment the user experience.

In the basic metadata process 331, a set of basic metadata is associated to every file added to the platform. Content sources in PDF and ePUB formats may be identified by their unique ISBN number. Once validated, ISBN numbers are matched against metadata sources such as the "ONIX for Books" international standard that describes a comprehensive list of data elements and components. Typically, basic metadata represents a small subset of the ONIX standard, including author, title, publisher name, release date, short description, cover page, and other book specific data that are selected by the service provider amount a pre-determined set of available data. As not all content can be associated with an existing ISBN number, for example user-generated content or unpublished academic content, the basic metadata process 331 also automatically extracts metadata by the analysis of file properties and content indexing for key word detection.

The document metadata process 332 creates and extracts metadata by deconstructing documents into basic elements of information. A partial list of document specific metadata includes, for example, sizes of images, types of images (such as graphs, tables, and pictures), locations, captions, number and size of columns, paragraphs, type of layout, embedded references, partial and full content indexing, border size, blank pages, and many others. Collectively, these document specific metadata are referred to herein as "document structure metadata." Document structure metadata identifies the location and composition of elements of information that make up a printed document. For example, the document structure metadata can identify the part of the document, such as title, subtitle, chapter, caption, image, sample questions, and the like, as well as where it is located within the printed document page.

The document metadata process 332 extracts metadata by deconstructing documents into basic elements of information by following a collection of rules to identify the parts of the document. For example, a page may be analyzed to determine the location of every character, blank space, and image on the page. The fonts of the characters are also analyzed to group characters into regions having the same font. To determine whether a region corresponds to a heading, subheading, body text, caption, or other identifiable part of the page, the relative size of the font, the position of the region relative to other known regions or objects, and the presence/absence of numbers that appear in a table of contents or index, may be considered. In one implementation, a series of rules are applied to categorize a region. For example, a region that has a larger font, has relatively few words, and spans more than one column is a heading. A region that is adjacent to an image and has relatively few words, is a caption. Reference to an index and/or table of contents of the document may also be helpful in classifying regions, as they may list the page numbers on which sections, images, etc., appear.

In one embodiment, by extracting document structure metadata during ingestion and storing it in connection with the ingested document, the platform has knowledge about the document that may be applied to delivering a richer reading experience to an end user. For example, if it is known that a particular segment of text is a caption for a picture on page of document, the picture and caption can be replaced or alternately shown with a multimedia element, for example a slide show with appropriate captions, a video clip with a related caption, or the like. As another example, if it is known that a section of a chapter of a text book contains review questions, the section can be replaced with an interactive quiz covering related content. As still other examples, substitutions or additions to other parts of a document may include merchandising offers, links to related content, or feedback mechanisms to teachers and/or authors.

The enhanced metadata process 333 relies on the outcome of both the basic metadata process 331 and the document metadata process 332 to create an additional layer of metadata based on the combination of semantic analysis and business intelligence, in one implementation. From the fully indexed content, a semantic analyzer identifies key concepts, words and expressions that are necessary to support enhanced search features from within specific content as well as across one or more categories of content. From business intelligence, additional metadata such as content ratings, awards, bundles, discount prices, free chapters and reviews are among various other elements of information that may be included as enhanced metadata.

Staging 340: The content staging sub-system 340 of the publishing system 130 includes three processes: administration 341, assets repository 342, and content approval 343. In the administration process 341, the content workflow is monitored, for example, by monitoring the recorded changes to the content in the file manifest to enable the identification and correction of any remaining quality issues, such as pages that have been flagged by previous processes for quality concerns. The assets repository process 342 stores the processed content, metadata, and other assets in preparation for final approval prior to delivery. The content approval process 343 validates content that meets the quality requirements and marks the content as approved for distribution. At this point, the content is prepared for final delivery to end-users.

Distribution System

Figure 4:
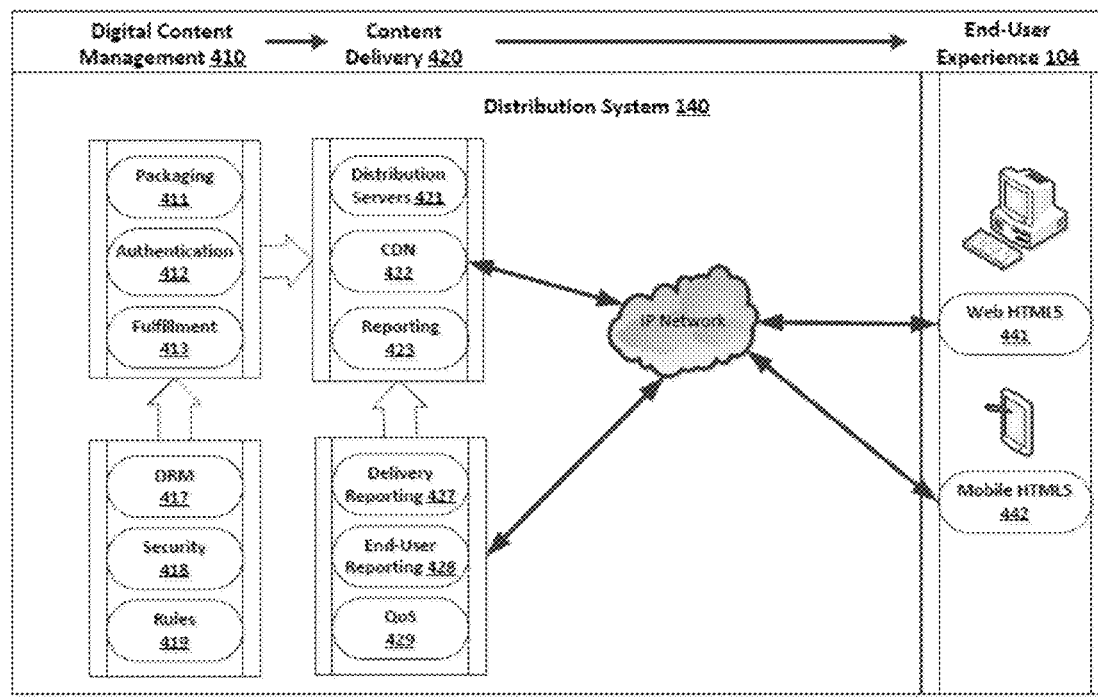
FIG. 4 illustrates a block diagram of a distribution system, in accordance with an embodiment.

FIG. 4 illustrates a block diagram of a distribution system 140, in accordance with an embodiment. The distribution system 140 is a sub-system of the management function block 102 of the platform illustrated in FIG. 1. The distribution system 140 packages the content for delivery, uploads the content to content distribution networks, and makes the content available to end-users based on the content's digital rights management policies. Functionally, the distribution system 140 includes two primary sub-systems: digital content management 410 and content delivery 420.

Digital content management 410: The digital content management sub-system 410 includes three processes: packaging 411, authentication 412, and fulfillment 413.

The packaging process 411 packages together all files associated with a particular portion of a content file, referred to as an "asset," before the asset is distributed. Specifically, content and metadata files include, for example, pictures of different resolution, character fonts, thumbnails, and a bookmarked table of contents, that are combined together into a data package that represents the asset.

The authentication process 412 prepares the content for distribution according to content protection mechanisms that may vary according to service offerings, may vary according to publishers, and/or even may vary according to individual assets. The authentication process 412 receives input from DRM module 417, security module 418, and rules module 419. The DRM module 417 encrypts content into a DRM layer, typically using Advanced Encryption Standard (AES) Kerberos 128, which protects the content from being easily copied by end-users once it is partially downloaded to their client device. The security module 418 protects content by additional security layers defined at the service level, in one embodiment. These additional security layers are typically the result of complex eCommerce business rules that specify how content needs to be protected. The rules module 419 defines the business rules governing content protection that are specific to content owners, may be specific to the particular service being deployed and/or the specific asset. The level of content protection can be adjusted based on the content that is being distributed across particular services. As an example, a publisher may want to limit the number of pages that can be printed by the end-user. As another example, a chapter of a book may be available for free. As another example, content be bundled into time-based promotional offers.

The fulfillment process 413 tracks the status of an order once a purchase order is received by the management function block 102 of the platform. The content associated with the order is identified, associated to the account that created the order, and marked for distribution. The fulfillment process 413 reports the status of the order to the eCommerce system 160 of the management function block 102. As an example, a typical order is processed through a number of logical steps, including order configuration, order booking, acknowledgement/confirmation, invoicing/billing, order changes, order processing, delivery, settlement, and returns/refunds.

Content delivery 420: The content delivery sub-system 420 handles the delivery of content to end-users. The content delivery sub-system 420 includes three processes: distribution servers 421, content distribution networks 422, and reporting 423.

The distribution servers process 421 centralizes the content available for distribution before uploading it to the content distribution networks (CDN), based on the outcome of the digital content management sub-system 410. User-generated content created by end-user web applications is also uploaded by the distribution servers process 421 so that it can be stored, synchronized and redistributed to the CDN network for later consumption.

The content distribution networks process 422 uploads content to the CDN origin server. Once the content is uploaded to the CND origin server, the content is pushed automatically to CDN edge servers geographically distributed around the country where each page and elements of a document are referenced with its own short time-based URL shared with an end-user web application. Hence, the content is effectively protected from unauthorized distribution. In one implementation, third-party CDN server infrastructure, such as Akamai for example, is used to host the content closer to end-users, facilitating scalability and performance requirements of the server infrastructure while improving user experience access time to the content.

The reporting process 423 receives input from a delivery reporting module 427, an end-user reporting module 428, and a quality of service module 429 in order to report on issues that may affect the user's experience or digital right management. The delivery reporting module 427 reports content that is recorded as delivered to the end-user web application so that content delivery issues can be monitored across the CDN and distribution servers. As examples, incorrect URLs or obsolete time sensitive URLs need to be identified and renewed based on the digital content management sub-system 410. The end-user reporting module 428 receives reports from the end-user web application that monitors reading activities and aggregates these into a report on a frequent periodic basis. Examples of activities tracked include the number of printed document pages and volume of copy/paste activities, as defined by business rules specified by individual publishers or platform-wide business rules. The quality of service module 429 aggregates data reported by web applications and their users to identify service level issues that are possibly affecting the overall quality of the user experience. Examples of quality of service issues include incorrectly formatted content, CDN latencies or content synchronization issues.

Back-Office System

Figure 5:
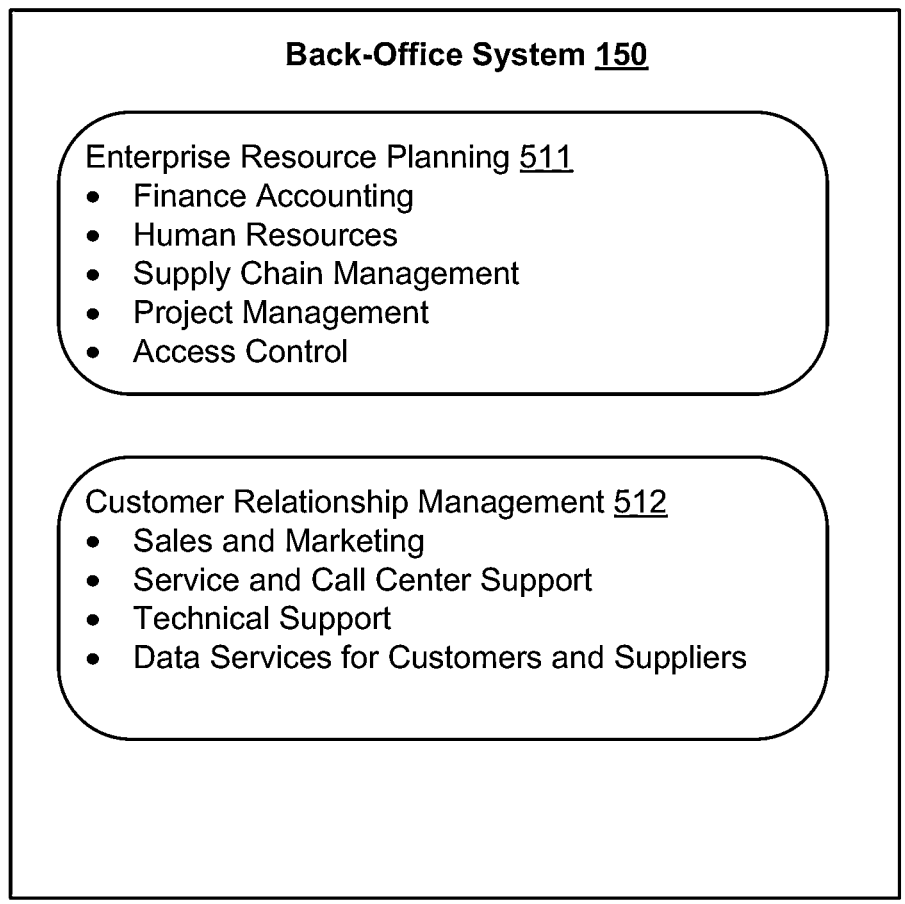
FIG. 5 illustrates a block diagram of a back-office system, in accordance with an embodiment.

FIG. 5 illustrates a block diagram of a back-office system 150, in accordance with an embodiment. The back-office system 150 is a sub-system of the management function block 102 of the platform illustrated in FIG. 1. The back-office system 150 integrates the processes dedicated to running the business, identified as enterprise resource planning 511 and the processes dealing with the customers for the business, globally identified as customer relationship management 512.

Within enterprise resource planning 511, the back-office system 150 performs finance accounting tasks such as maintaining the general ledger, tracking payables and receivables, managing the cash and fixed assets, and budgeting. The back-office system 150 also handles human resource tasks such as payroll, training, benefits, recruiting, and diversity management, as well as handling supply chain management, including inventory, order entry, purchasing, claim processing, and commissions. The back-office system 150 may also be used for project management, including costing, billing, time and expense calculations, performance units, and activity management. Lastly, the enterprise resource planning 511 of the back-office system 150 may also be used to control access and manage user privileges for internal and external processes.

Within customer relationship management 512, the back-office system 150 manages the interactions with the customers, clients, and sales prospects by synchronizing business specific processes, including sales and marketing, customer service and call center support, technical support, and data services for customers and suppliers.

eCommerce System

Figure 6:
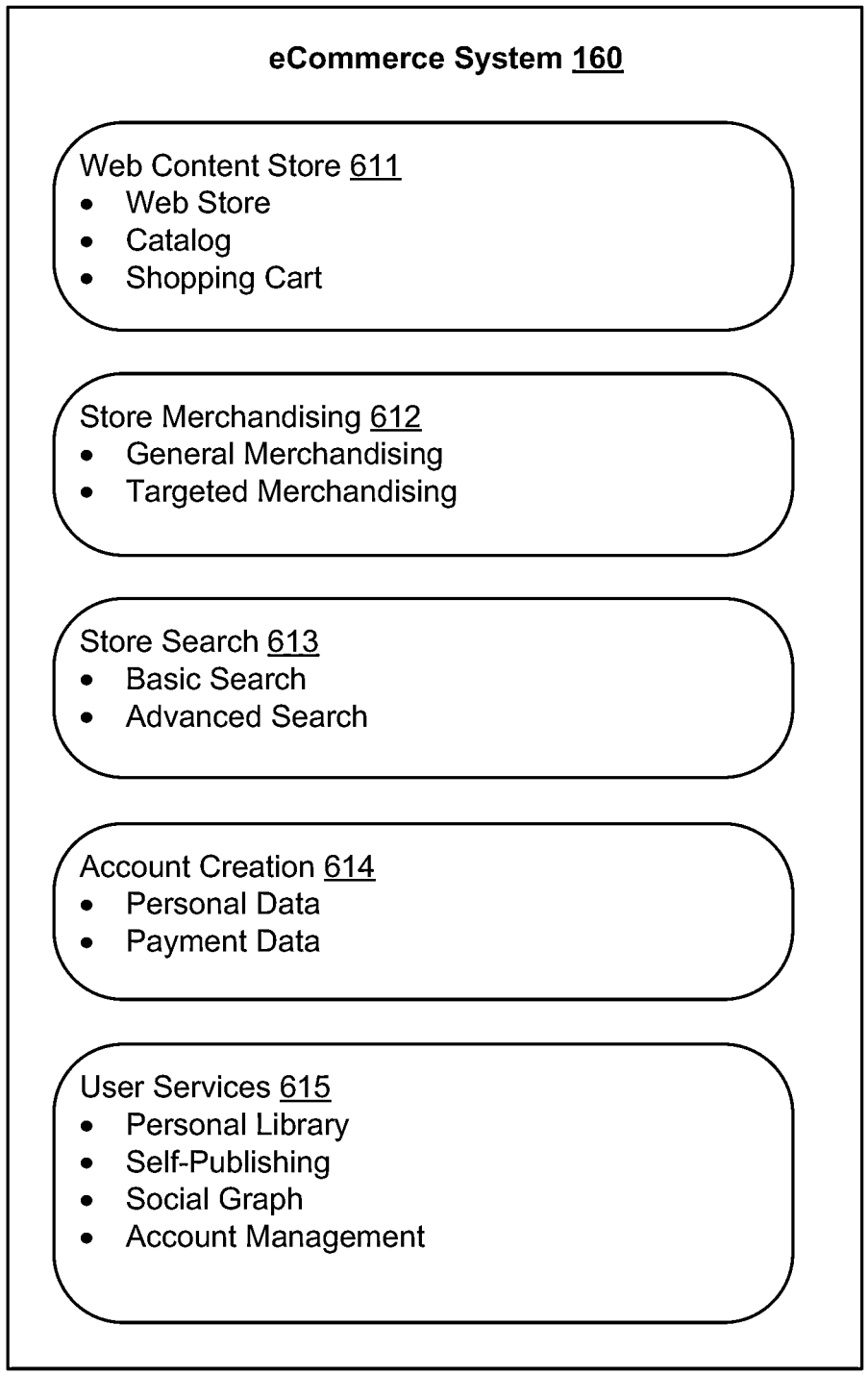
FIG. 6 illustrates a block diagram of an eCommerce system, in accordance with an embodiment.

FIG. 6 illustrates a block diagram of an eCommerce system 160, in accordance with an embodiment. The eCommerce system 160 is a sub-system of the management function block 102 of the platform illustrated in FIG. 1. The eCommerce system 160 manages the online processes of marketing, selling, servicing and receiving payment for digital products and services. As such, the eCommerce system 160 is closely interfaced to the publishing system 130 and distribution system 140, as well as to the back-office system 150. The eCommerce system 160 components include the web content store 611, store merchandising 612, store search 613, account creation 614, and user services 615.

The web content store component 611 presents to customers all available content and services. The web store is accessed by connecting to an on-line website that defines how content is being offered to customers. For example, a digital education store includes a large library of textbooks, academic content, and other tradebooks, such as Biology, Economics, and Philosophy, for example, as well as various education and social specific services that are offered to students, teachers, and other users. The web content store 611 also includes at least one product content catalog that assembles content available from the web store. Catalogs may be organized around content categories, topics, or types, and may include metadata such as pricing, professional reviews, awards, descriptions, user reviews and thumbnails, for example. The web content store 611 also includes a shopping cart. The shopping cart is a software component that allows web content store customers to accumulate a list of items for purchase. Upon checkout, the shopping cart software typically calculates a total for the order, including taxes, as applicable.

The store merchandizing component 612 comprises general merchandizing and targeted merchandising. General merchandising includes promoting specific products from the content catalog and offering them for sale at the web content store 611. This is a sales driven activity that is usually accomplished via a combination of analytics, product placement, price offerings, promotion and other business intelligence services. Targeted merchandising includes presenting specific products and services that are tailored to the end-user or group of end-users based on their respective profiles, analytics and/or reported activities.

The store search component 613 includes in one implementation a basic search and an advanced search. The basic search comprises searching through the available store content. Typical searches include document titles, topics, categories, authors, publishers and other available catalog metadata. The advanced search comprises searching for key words or specific expressions within the available content store. In this advanced search mode, the user provides the search engine with a phrase which defines a semantic concept for which the user is trying to gather information. The results of the search typically locate a number of documents that together aggregate the information desired to be gathered.

The account creation component 614 creates and registers a secure account for a user, so that the user is able to purchase content and services from the web content store 611. The account creation component 614 stores personal account data, such as name, address, email, phone number, login and password information. In addition to personal data, end users may also enter their payment information such as credit card number, PayPal or bank account details in order to be able to purchase content and services from the web content store 611. Payment data is then linked to the shopping cart for processing purchases as they occur.

The user services component 615 manages a number of customer-based services that are available as part of the web content store 611 offerings. For example, a digital education platform may include a number of services such as personal library, self-publishing, a user's social graph, and account management, among others.

The personal library is the aggregation of content and services purchased and created over time by an individual end user. In a digital education platform, it would typically include all textbooks and tradebooks purchased by a student, as well as all the student's user-generated content such as notes, highlights, and other comments.

Self-publishing is a service offered to end users interested in publishing their own content. In a digital education platform, a student or teacher may have content that they would want to share with their peers. For example, a student may have developed a course outline or other study materials to share with other students, and a teacher may have lecture materials or practice exams to share with other teachers or students. As such, the self-publishing service would ingest that content into the platform and add it to the content catalog, or a subset of it, as identified by the end user rights and privacy settings.

In one embodiment, the social graph is a system to determine, display, and act upon the relationships among all users of the online education platform, including students, teachers, and authors. For example, the social graph of a student is the collective connections between the student and the student's teachers, classes, classmates, etc. The social graph of a teacher is the collective connections between the teacher and the teacher's students, classes, colleagues, etc. The social graph of an author is the collective connections between the teachers that use the author's book, the students reading the author's book, etc. Collectively, these links and connections define how specific content and services can be tailored and proposed to specific end users.

Account management includes user-specific services that are dedicated to the setting, management, and monitoring of a particular account, including privacy, personal data, transaction listings, banking information and social graph information among other aspects.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for distributing educational electronic documents, the method comprising:
   generating markup language page elements and document structure metadata that collectively preserve page fidelity of a document having a plurality of correlated pages, the page fidelity preserved across a plurality of targeted web browsers, the markup language page elements corresponding to elements of information on each correlated page of the document and the document structure metadata identifying locations and composition of the elements of information;
   packaging the markup language page elements and the document structure metadata into a plurality of assets for delivery, each asset of the plurality of assets including the markup language page elements and the document structure metadata for a portion of the document;
   generating for an asset of the plurality of assets, a unique time-based URL referencing the markup language page elements of the asset and establishing a time of expiry of the markup language elements of the asset, the unique time-based URL referencing the markup language elements of the asset prior to the time of expiry and not referencing the markup language elements of the asset after the time of expiry; and transferring the unique time-based URL of the asset to end-user web applications of authorized users, the end-user web applications executing in the targeted web browsers for using the unique time-based URL to access the markup language page elements and the document structure metadata to reconstruct and display one or more pages of the document with page fidelity to the document.

2. The method of claim 1, further comprising:

rendering each page of the document from the respective markup language page elements; and comparing, by a correlation engine, each rendered page to a respective page of the document to establish a correlation factor between the rendered page and the page of the document, the correlation factor indicating a quality of the page fidelity.

3. The method of claim 1, wherein packaging the markup language page elements into assets comprises:

encrypting the markup language page elements of each asset into a digital rights management (DRM) layer prior to distributing the markup language page elements, the DRM layer specifying rules for accessing pages of the asset.

4. The method of claim 1, further comprising:

receiving reports from the end-user web applications identifying quality of service issues relating to the reconstruction of the one or more pages of the document.

5. The method of claim 1, further comprising:

ingesting user-generated content related to an educational course from the end-user web applications; and processing the user-generated content into a self-published document related to the educational course.

6. The method of claim 1, further comprising:

receiving reports of activities of a user related to the document; and storing the received user activities in relation to the markup language page elements and an account of the user.

7. A non-transitory computer-readable storage medium storing executable computer program instructions for distributing educational electronic documents, the computer program instructions comprising instructions for:

generating markup language page elements and document structure metadata that collectively preserve page fidelity of a document having a plurality of correlated pages, the page fidelity preserved across a plurality of targeted web browsers, the markup language page elements corresponding to elements of information on each correlated page of the document and the document structure metadata identifying locations and composition of the elements of information;

packaging the markup language page elements and the document structure metadata into a plurality of assets for delivery, asset of the plurality of assets including the markup language page elements and the document structure metadata for a portion of the document;

generating for an asset of the plurality of assets, a unique time-based URL referencing the markup language page elements of the asset and establishing a time of expiry of the markup language elements of the asset, the unique time-based URL referencing the markup language elements of the asset prior to the time of expiry and not referencing the markup language elements of the asset after the time of expiry; and transferring the unique time-based URL of the asset to end-user web applications of authorized users, the end-user web applications executing in the targeted web browsers for using the unique time-based URL to access the markup language page elements and the document structure metadata to reconstruct and display one or more pages of the document with page fidelity to the document.

8. The non-transitory computer-readable storage medium of claim 7, the computer program instructions further comprising instructions for:

rendering each page of the document from the respective markup language page elements; and comparing, by a correlation engine, each rendered page to a respective page of the document to establish a correlation factor between the rendered page and the page of the document, the correlation factor indicating a quality of the page fidelity.

9. The non-transitory computer-readable storage medium of claim 7, wherein the computer program instructions for packaging the markup language page elements into assets comprises:

encrypting the markup language page elements of each asset into a digital rights management (DRM) layer prior to distributing the markup language page elements, the DRM layer specifying rules for accessing pages of the asset.

10. The non-transitory computer-readable storage medium of claim 7, the computer program instructions further comprising instructions for:

receiving reports from the end-user web applications identifying quality of service issues relating to the reconstruction of the one or more pages of the document.

11. The non-transitory computer-readable storage medium of claim 7, the computer program instructions further comprising instructions for:

ingesting user-generated content related to an educational course from the end-user web applications; and processing the user-generated content into a self-published document related to the educational course.

12. The non-transitory computer-readable storage medium of claim 7, the computer program instructions further comprising instructions for:

receiving reports of activities of a user related to the document; and storing the received user activities in relation to the markup language page elements and an account of the user.

13. An educational electronic document delivery platform, comprising:

a processor for executing computer program code; and a non-transitory computer readable storage medium storing executable computer program code for:

a publishing system configured to:

generate markup language page elements and document structure metadata that collectively preserve page fidelity of a document having a plurality of correlated pages, the page fidelity preserved across a plurality of targeted web browsers, the markup language page elements corresponding to elements of information on each correlated page of the document and the document structure metadata identifying locations and composition of the elements of information, and package the markup language page elements and the document structure metadata into a plurality of assets for delivery, each asset of the plurality of assets including the markup language page elements and the document structure metadata for a portion of the document; and a distribution system configured to
generate for an asset of the plurality of assets, a unique time-based URL referencing the markup language page elements of the asset and establishing a time of expiry of the markup language elements of the asset, the unique time-based URL referencing the markup language elements of the asset prior to the time of expiry and not referencing the markup language elements of the asset after the time of expiry; and transfer the unique time-based URL of the asset to end-user web applications of authorized users, the end-user web applications executing in the targeted web browsers for using the unique time-based URL to access the markup language page elements and the document structure metadata to reconstruct and display one or more pages of the document with page fidelity to the document.

14. The platform of claim 13, wherein the publishing system comprises a correlation engine configured to:
render each page of the document from the respective markup language page elements; and
compare each rendered page to a respective page of the document to establish a correlation factor between the rendered page and the page of the document, the correlation factor indicating a quality of the page fidelity.

15. The platform of claim 13, wherein the publishing system packages the markup language page elements into assets by encrypting the markup language page elements of each asset into a digital rights management (DRM) layer prior to distributing the markup language page elements, the DRM layer specifying rules for accessing pages of the asset.

16. The platform of claim 13, wherein the distribution system comprises a delivery reporting module configured to:
receive reports from the end-user web applications identifying quality of service issues relating to the reconstruction of the one or more pages of the document.

17. The platform of claim 13, wherein the distribution system comprises an end-user reporting module configured to:
ingest user-generated content related to an educational course from the end-user web applications; and
process the user-generated content into a self-published document related to the educational course.

* * * * *